United States Patent
Miyazawa et al.

(10) Patent No.: US 9,682,684 B2
(45) Date of Patent: Jun. 20, 2017

(54) ELECTRONIC KEY DEVICE

(71) Applicant: ALPS ELECTRIC CO., LTD., Tokyo (JP)

(72) Inventors: Akira Miyazawa, Miyagi-ken (JP); Ichiro Nakahara, Miyagi-ken (JP); Katsuhiro Seino, Miyagi-ken (JP); Yoshio Sampei, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 89 days.

(21) Appl. No.: 14/717,831

(22) Filed: May 20, 2015

(65) Prior Publication Data
US 2016/0001742 A1   Jan. 7, 2016

(30) Foreign Application Priority Data
Jul. 2, 2014   (JP) ................. 2014-136458

(51) Int. Cl.
*B60R 25/24*   (2013.01)
*G07C 9/00*   (2006.01)

(52) U.S. Cl.
CPC ........ *B60R 25/245* (2013.01); *G07C 9/00309* (2013.01); *G07C 2209/63* (2013.01)

(58) Field of Classification Search
CPC combination set(s) only.
See application file for complete search history.

(56) References Cited

U.S. PATENT DOCUMENTS

| | | | |
|---|---|---|---|
| 8,831,526 B2* | 9/2014 | Hasegawa | H04B 17/0042 455/562.1 |
| 2003/0153312 A1* | 8/2003 | Lee | H04W 36/32 455/436 |
| 2007/0109093 A1 | 5/2007 | Matsubara et al. | |
| 2010/0201483 A1* | 8/2010 | Nakajima | B60R 25/245 340/5.61 |
| 2011/0019599 A1* | 1/2011 | Wood | G01S 3/04 370/310 |
| 2015/0070136 A1* | 3/2015 | Kameyama | B60R 25/20 340/5.72 |

FOREIGN PATENT DOCUMENTS

| | | |
|---|---|---|
| JP | 2007-132139 | 5/2007 |
| JP | 2012-017558 | 1/2012 |

* cited by examiner

*Primary Examiner* — Thomas G Black
*Assistant Examiner* — Ana Thomas
(74) *Attorney, Agent, or Firm* — Beyer Law Group LLP

(57) ABSTRACT

An electronic key device includes a portable device capable of being carried by a user, and a vehicle-mounted device configured to perform mutual communication with the portable device to perform predetermined control. The vehicle-mounted device includes a plurality of antennas that is provided in different positions of a vehicle and is configured to transmit radio waves every predetermined time. A response signal based on the reception strength of the radio waves transmitted from the plurality of antennas is transmitted from the portable device to the vehicle-mounted device. The vehicle-mounted device determines that a moving direction of the portable device heads for any one of the antennas based on the response signal, and when it is determined that a distance between the vehicle and the portable device is equal to or less than a predetermined threshold, control is performed such that a door becomes unlocked.

5 Claims, 6 Drawing Sheets

ELECTRONIC KEY DEVICE

CLAIM OF PRIORITY

This application claims benefit of Japanese Patent Application No. 2014-136458 filed on Jul. 2, 2014, which is hereby incorporated by reference.

BACKGROUND OF THE INVENTION

1. Field of the Invention

The present invention relates to an electronic key device configured to perform predetermined control such as unlocking of doors of a vehicle by performing mutual communication between a vehicle-mounted device and a portable device.

2. Description of the Related Art

In a radio device described in Japanese Unexamined Patent Application Publication No. 2007-132139, portable means receives radio waves transmitted from a plurality of antennas provided in different positions of a vehicle, and a main control unit calculates a relative position of the portable means with respect to the vehicle based on electric field intensity measured by the portable means, and performs control such that doors of the vehicle are locked or unlocked based on the calculated relative position.

In a control system described in Japanese Unexamined Patent Application Publication No. 2012-17558, a RSSI check command is transmitted from a LF transmission unit provided at doors or a trunk of a vehicle, a RSSI value of the received RSSI check command is detected by a key, and the detected RSSI value is returned to the vehicle. In the vehicle, when the received RSSI value is equal to or greater than a predetermined threshold, the door or the trunk becomes unlocked.

However, in the radio device described in Japanese Unexamined Patent Application Publication No. 2007-132139 or the control system described in Japanese Unexamined Patent Application Publication No. 2012-17558, even when a user who does not try to enter the vehicle passes within an approach unlock area of a predetermined distance from the vehicle, there is a problem in that the doors or the trunk become unlocked.

SUMMARY OF THE INVENTION

The present invention provides an electronic key device configured to reliably unlock doors or a trunk of a vehicle only when a user who enters an approach unlock area approaches the doors or the trunk.

According to an aspect of the present invention, there is provided an electronic key device including a portable device capable of being carried by a user; and a vehicle-mounted device configured to perform mutual communication with the portable device to perform predetermined control. The vehicle-mounted device includes a plurality of antennas that is provided in different positions of a vehicle and is configured to transmit radio waves every predetermined time. A response signal based on the reception strength of the radio waves transmitted from the plurality of antennas is transmitted from the portable device to the vehicle-mounted device. The vehicle-mounted device determines that a moving direction of the portable device heads for any one of the antennas based on the response signal, and when it is determined that a distance between the vehicle and the portable device is equal to or less than a predetermined threshold, control is performed such that a door becomes unlocked.

Here, the phrase "radio waves are transmitted every predetermined time" includes a case where the transmission interval of the radio waves is changed during the transmission in addition to a case where the radio waves are transmitted every regular cycle.

Thus, when a user enters an approach unlock area, and only when the user approaches toward vehicle compartment doors and a trunk door of a vehicle, that is, only when the user tries to enter the vehicle, it is possible to reliably unlock the door.

In the electronic key device according to the aspect of the present invention, when it is determined that a distance between the antenna and the portable device is less than the distance obtained from the response signal received at the previous time by a predetermined percentage or more or a predetermined difference or more, the vehicle-mounted device may determine that the portable device heads for any one of the antennas.

Here, the "response signal received at the previous time" includes a response signal received at a time before the "immediately previous time" in addition to the response signal received at the immediately previous time" which is a time before a predetermined time.

As mentioned above, since the determination is performed using the ratio or the differences between the distances at two different times, it is possible to reliably determine the moving direction of the user who carries the portable device with a simple configuration. Here, the ratio is not limited to the ratio based on the distance at the immediately previous time, that is, the time before one cycle, and may be a ratio based on distances every two cycles or every three cycles.

In the electronic key device according to the aspect of the present invention, the portable device may include a three-axis antenna capable of detecting reception strength in three directions crossing each other, and may calculate a reception vector indicating a direction in which the reception strength is the highest based on the reception strength from the three directions. The vehicle-mounted device may determine whether or not a moving direction of the portable device heads for any one of the antennas from information related to the reception vector included in the response signal.

Accordingly, since it is determined whether or not the moving direction of the portable device heads for any one of the antennas from the information related to the reception vector, the electronic key device can have a simple configuration, and it is possible to reduce a load in the determination process of the vehicle-mounted device.

In the electronic key device according to the aspect of the present invention, when a time change in the direction of the reception vector is less than a predetermined value, it may be determined that the moving direction of the portable device heads for any one of the antennas.

The reception vector is a quantity having reception strength and direction. However, the determination is performed by a time change in the direction of the reception vector.

In the electronic key device according to the aspect of the present invention, the plurality of antennas may be provided near vehicle compartment doors of the vehicle and near a trunk door.

Accordingly, since it is possible to specifically determine which door the user tries to approach, it is possible to reliably unlock the door only when the user tries to enter the vehicle.

In the electronic key device according to the aspect of the present invention, when it is determined that the moving direction of the portable device heads for any one of the antennas and the distance between the vehicle and the portable device is equal to or less than a predetermined threshold, control may be performed such that the door closest to the antenna for which the portable device heads becomes unlocked.

DESCRIPTION OF THE PREFERRED EMBODIMENTS

Hereinafter, an electronic key device according to embodiments of the present invention will be described in detail with reference to the drawings.

First Embodiment

Figure 1:
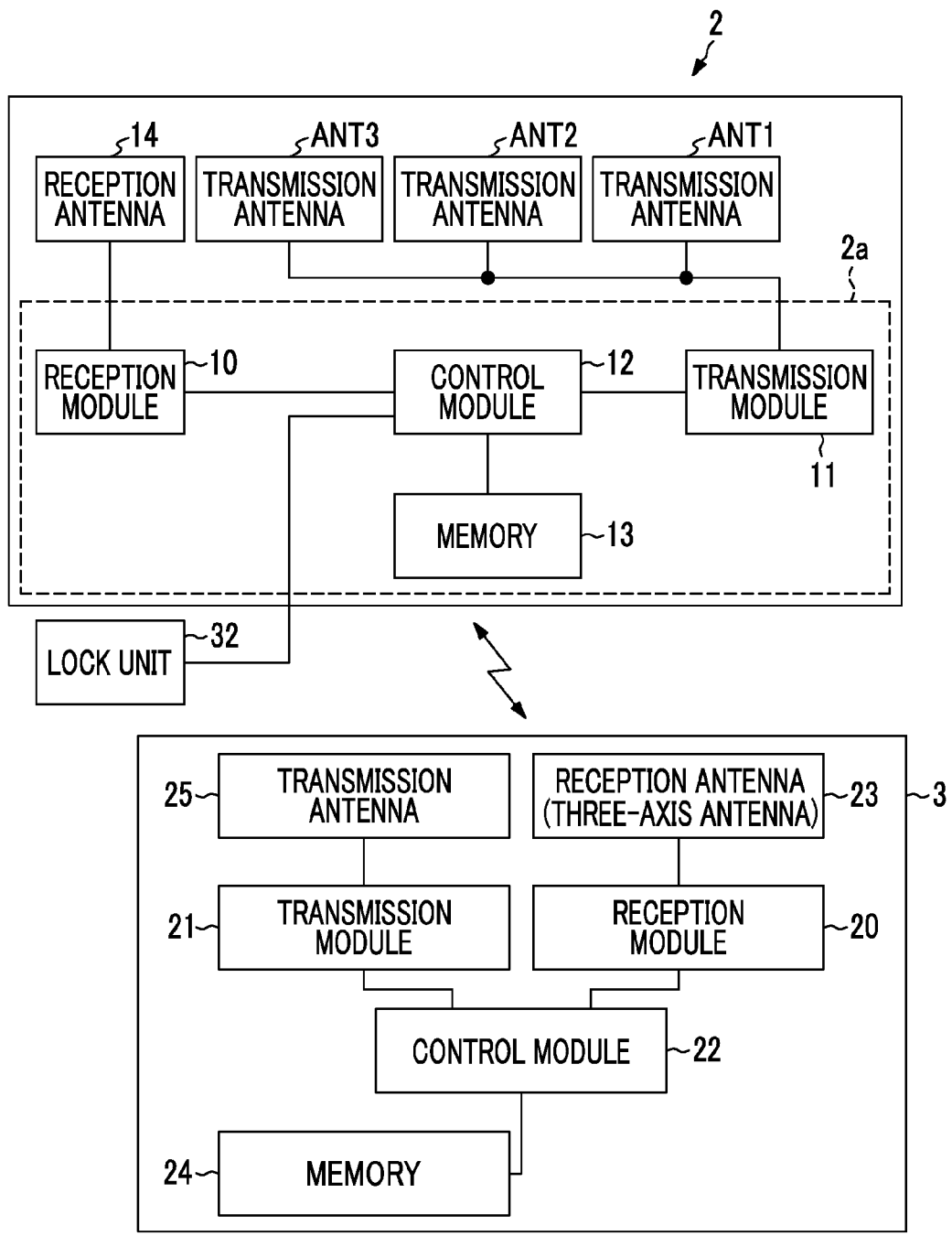
FIG. 1 is a block diagram showing the configuration of an electronic key device according to a first embodiment.
Figure 3:
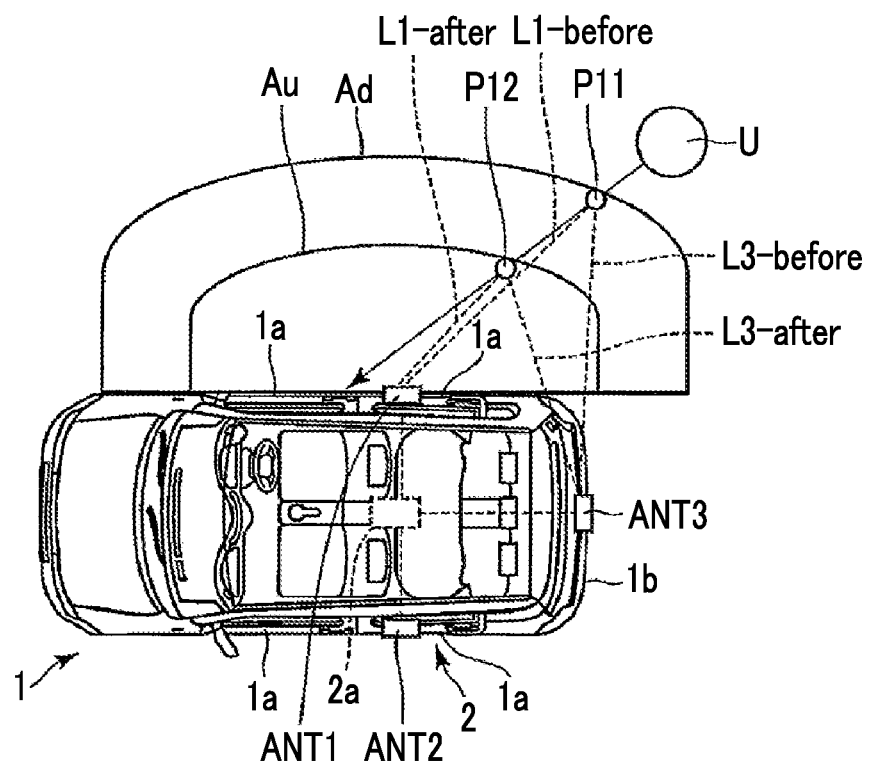
FIG. 3 is a plan view showing the configuration of a vehicle-mounted device according to the first embodiment, and is a diagram showing Moving Path Example 1 of a user.

FIG. 1 is a block diagram showing the configuration of an electronic key device according to a first embodiment. FIG. 3 shows the configuration of a vehicle-mounted device according to the first embodiment.

The electronic key device according to the first embodiment performs control such that a plurality of vehicle compartment doors 1a and a trunk door 1b are unlocked by providing a vehicle-mounted device 2 on a vehicle 1 and mutually performing wireless communication with a portable device 3 capable of being carried by a user, and performs a predetermined controls of other vehicle 1. Here, the door includes the vehicle compartment doors 1a and the trunk door 1b.

The vehicle-mounted device 2 includes an electronic control unit 2a disposed within the vehicle 1, three transmission antennas ANT1 to ANT3, and a reception antenna 14. The electronic control unit 2a includes a vehicle reception module 10 (reception module), a vehicle transmission module 11 (transmission module), a vehicle control module 12 (control module), and a memory 13.

The vehicle transmission module 11 transmits radio waves to the portable device 3 through the transmission antennas ANT1 to ANT3 every predetermined time (for example, 100 ms), and the vehicle reception module 10 receives a response signal including information related to a distance calculated based on, for example, the reception strength of the radio waves transmitted from the vehicle-mounted device 2 through the reception antenna 14, as a signal transmitted from the portable device 3.

The response signal transmitted from the portable device 3 may be a signal that does not include a distance. The response signal in this case is a signal based on the reception strength of the radio waves transmitted through the transmission antennas ANT1 to ANT3, and the distance is calculated by the vehicle-mounted device 2 that receives the response signal.

The vehicle control module 12 performs (1) control of the operations of the vehicle reception module 10 and the vehicle transmission module 11, performs (2) approach determination (determination of the moving direction of the portable device 3) of whether or not the portable device 3 heads for any one of the antennas based on the response signal transmitted from the portable device 3, performs (3) distance determination of whether or not a distance between the vehicle 1 and the portable device 3 is equal to or less than a predetermined threshold based on the response signal transmitted from the portable device 3, and performs (4) control such that the vehicle compartment door 1a closest to the antenna facing the portable device 3 becomes unlocked when it is determined that the portable device 3 heads for any one of the transmission antennas ANT1 to ANT3 in the approach determination and it is determined that the distance between the vehicle 1 and the portable device 3 is equal to or less than the predetermined threshold in the distance determination. Here, when the threshold used in the distance determination is a value corresponding to an approach unlock area Au (FIGS. 3 to 6) and the distance is equal to or less than the threshold, it is determined that the portable device 3 is located within the approach unlock area Au.

More specifically, the approach determination performed by the vehicle control module 12 is as follows.

(a) It is determined that the portable device 3 heads for any one of the antennas when it is determined that the distance included in the response signal transmitted from the portable device 3 is less than the distance included in the response signal received at a previous time (for example, a time before a predetermined time (immediately previous time)).

Here, the "response signal received at the previous time" includes the response signal received at a time before the "immediately previous time" in addition to the response signal received at the immediately previous time.

(b) When a ratio "Lbefore/Lafter" of a distance Lafter included in the response signal transmitted from the portable device 3 to a distance Lbefore included in the response signal received at the previous time is equal to or greater than a predetermined value, or when a difference "Lbefore−Lafter" between the distance Lafter included in the response signal and the distance Lbefore included in the response signal received at the previous time is equal to or greater than a predetermined value, the distance included in the response signal is shorter than the distance included in the response signal received at the previous time. In this case, it is determined that the portable device heads for any one of the antennas.

Figure 4:
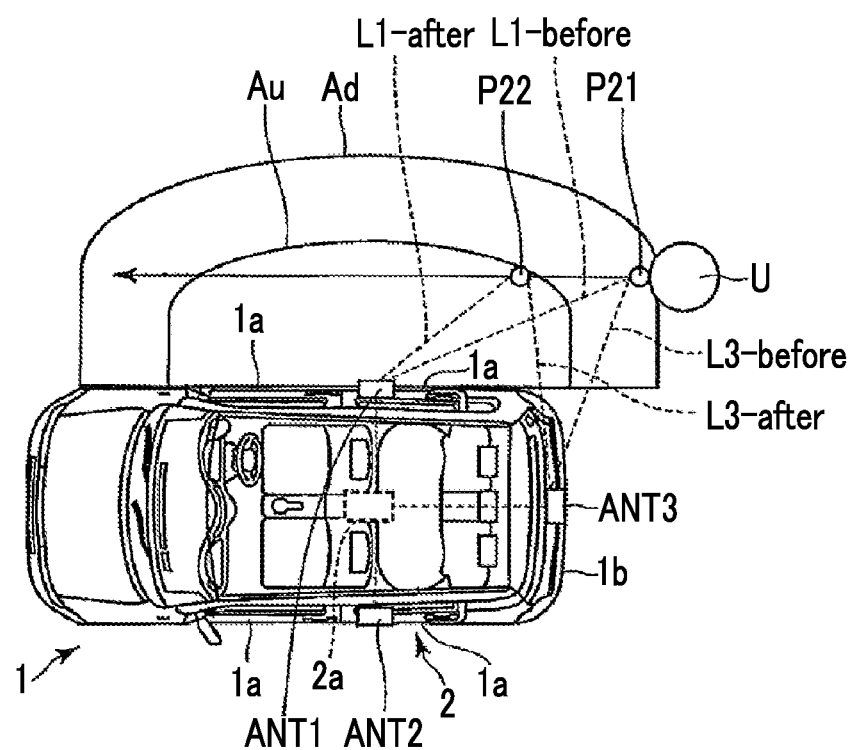
FIG. 4 is a plan view showing the configuration of a vehicle-mounted device according to the first embodiment, and is a diagram showing Moving Path Example 2 of the user.

Here, when a case where the user heads for the vehicle compartment door 1a of the vehicle 1 as shown in FIG. 3 is compared with a case where the user moves in parallel with the vehicle compartment door 1a of the vehicle 1 as shown in FIG. 4, a time change of "Lafter" with respect to "Lbefore" is small in the case shown in FIG. 4, whereas a time change is large when the user walks toward the vehicle compartment door 1a (AMT1) as shown in FIG. 3. Accordingly, it is possible to determine that the portable device heads for any one of the antennas by using the ratio "Lbefore/Lafter" or the difference "Lbefore−Lafter" corresponding to the time change.

Here, the "predetermined value" used in the determination is set depending on a time interval (predetermined time) during which the radio waves are transmitted to the portable device 3 from the vehicle-mounted device 2, a distance between the portable device 3 and the vehicle 1, the arrangement of the transmission antennas of the vehicle-mounted device 2, and a general walking speed of a human.

Here, as the approach determination, both the determinations (a) and (b) are preferably performed. Particularly, by performing the determination (b), it is possible to more accurately determine whether or not a moving direction of the user who carries the portable device 3 is a direction heading for any one of the antennas between two different times to be compared and which antenna the portable device is headed for.

A lock unit 32 that locks and unlocks the vehicle compartment doors 1a is connected to the vehicle control module 12, and the vehicle compartment doors 1a are unlocked under the control of the vehicle control module 12.

The memory 13 stores a unique ID of the vehicle, IDs of a plurality of portable devices capable of operating one vehicle, information required to perform predetermined control of the vehicle 1 based on data based on the reception strength of a measurement signal, and information related to a time interval of the signal transmitted from the vehicle-mounted device 2.

The three transmission antennas ANT1 to ANT3 for transmitting a signal at a first frequency are connected to the vehicle transmission module 11. Here, the first frequency is preferably a low frequency (LF) having a long wavelength in a range of, for example, 30 to 300 kHz, and may be a very low frequency (VLF).

The transmission antennas ANT1 to ANT3 are respectively provided in different positions of the vehicle 1, for example, near the plurality of vehicle compartment doors 1a and the trunk door 1b as shown in FIGS. 3 to 6. The three transmission antennas ANT1 to ANT3 are provided such that the portable device 3 can recognize the radio waves from the respective antennas by using a phase deviation, a frequency difference, transmission timing and a transmission order.

An approach detection area Ad, and an approach unlock area Au inside the approach detection area (FIGS. 3 to 6) are respectively set depending on the communication capacity and arrangement of these transmission antennas ANT1 to ANT3. Here, in FIGS. 3 to 6, the approach detection area Ad and the approach unlock area Au that are set to the right door are shown, and the approach detection area Ad and the approach unlock area Au that are set to the left door and the trunk door 1b are not shown.

The portable device 3 can receive the radio waves transmitted from the transmission antennas ANT1 to ANT 3 near the outside of the approach detection area Ad, and can receive the radio waves by entering an area where it is capable of receiving the radio waves from an area where it is not capable of receiving the radio waves. Thus, the state of the portable device is changed from a stand-by state to a wake-up state. The reception antenna 14 for receiving the signal transmitted from the portable device 3 is connected to the vehicle reception module 10. The number of transmission antennas of the vehicle-mounted device 2 may be four or more in consideration of the size of the vehicle, the number of doors, and measurement accuracy.

As shown in FIG. 1, the portable device 3 includes a portable-device reception module 20 (reception module), a portable-device transmission module 21 (transmission module), a portable-device control module 22 (control module), a portable-device reception antenna 23 (three-axis antenna), a portable-device transmission antenna 25, and a memory 24.

The portable-device reception module 20 receives the radio waves transmitted from the vehicle-mounted device 2. The portable-device control module 22 calculates distances between the portable device 3 and the three transmission antennas ANT1 to ANT3 of the vehicle-mounted device 2 based on the reception strength of the radio waves received by the portable-device reception module 20, and generates the response signal including these distances, in addition to controlling the operations of the portable-device reception module 20 and the portable-device transmission module 21. The portable-device transmission module 21 transmits the response signal including the distances calculated by the portable-device control module 22 to the vehicle-mounted device 2. The memory 24 stores an ID set to the portable device 3, an ID of the vehicle, information required to calculate the distances based on the reception strength of the radio waves, and information related to the time interval of the signal transmitted from the portable device 3.

The reception antenna 23 is connected to the portable-device reception module 20. The reception antenna 23 is a three-axis antenna having directivity characteristics in three directions crossing each other, and receives the signal having the first frequency transmitted from the vehicle transmission module 11. The transmission antenna 25 is connected to the portable-device transmission module 21. The transmission antenna 25 transmits the signal to the vehicle-mounted device 2 at a second frequency. The information related to the reception strength for calculating the distances is strength information received by each axis of the three axes of the reception antenna 23. Here, the second frequency is a frequency (RF) higher than the first frequency.

Figure 2:
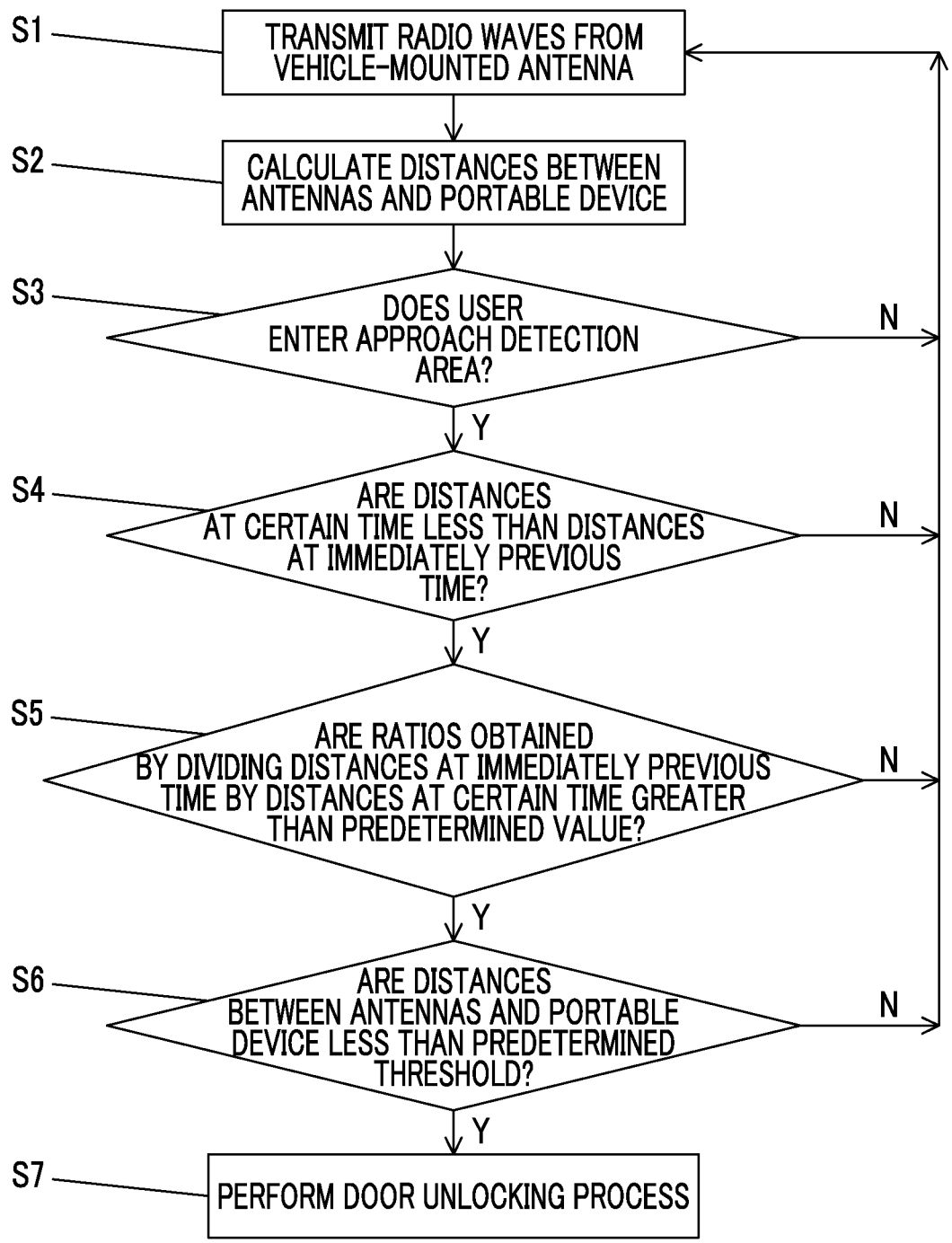
FIG. 2 is a flowchart showing the flow of processes performed by the electronic key device according to the first embodiment.

Next, the flow of unlock control performed by the electronic key device will be described with reference to FIG. 2. FIG. 2 is a flowchart showing the flow of processes performed by the electronic key device according to the first embodiment.

The vehicle transmission module 11 continues to transmit the radio waves to the portable device 3 every predetermined time (step S1). When the user who carries the portable device 3 approaches up to an area near the outside of the approach detection area Ad, the portable device 3 can receive the radio waves from the vehicle transmission module 11, and is in a wake-up state. Here, the radio waves transmitted from the vehicle transmission module 11 include a starting part and a strength measurement part, and the portable device 3 is started from a sleep state by the starting part, and is in the wake-up state.

The portable device 3 calculates the distances between the portable device and the three transmission antennas ANT1 to ANT3 of the vehicle-mounted device 2 based on the reception strength of the radio waves transmitted from the vehicle transmission module 11, and transmits the response signal including the information related to the calculated distances to the vehicle-mounted device 2 (step S2). The vehicle-mounted device 2 stores the received response signal in association with time in the memory 13.

The vehicle control module 12 obtains a position of the portable device 3 with respect to the vehicle 1 from the distances between the portable device 3 and the transmission antennas ATN1 to ANT3 which are included in the response signal transmitted from the portable device 3, and determines whether or not the portable device 3 enters the approach detection area Ad (step S3). Here, the antenna, which is blocked by the vehicle 1 due to the position of the portable device 3 and in which the portable device 3 is not capable of receiving the radio waves having a strength of a predetermined value or more, is not preferably used as a target in the following determinations. For example, as shown in FIGS. 3 to 6, when the portable device 3 moves from the right in the rear of the vehicle 1, since the radio waves from the antenna ANT2 are blocked by the vehicle 1 and are not received by the portable device 3 with sufficient strength, this antenna is preferably not used as a determination target.

The determination process of step S3 is omitted, and step S4 and the subsequent processes may be performed using two or more response signals received after the distances between the portable device 3 and the transmission antennas ANT1 to ANT3 are a predetermined distance (for example, a distance between the vehicle 1 and a boundary of the approach detection area Ad).

In step S3, while the portable device 3 does not enter the approach detection area Ad (N in step S3), determination of whether or not the portable device 3 enters the approach detection area Ad is repeatedly performed using the distances (step S2) calculated based on the radio waves (step S1) transmitted from the vehicle transmission module 11 every predetermined time. Meanwhile, when it is determined that the portable device 3 enters the approach detection area Ad (Y in step S3), the portable-device control module 22 determines whether or not the distances between the portable device 3 and the three transmission antenna ANT1 to ANT3 are less than the distances at the immediately previous time from the response signal transmitted from the portable device 3 (step S4).

In step S4, when it is determined that the distances between the portable device 3 and the antennas are equal to or greater than the distances at the immediately previous time (N in step S4), the vehicle control module 12 determines that the portable device 3 does not approach any one of the transmission antennas ANT1 to ANT3. Meanwhile, when distances between any of the three transmission antennas ANT1 to ANT3 (both of the antennas ANT1 and ANT3 which are determination targets in the examples of FIGS. 3 to 6) and the portable device 3 are less than the distances of the immediately previous time (Y in step S4), the vehicle control module 12 determines whether or not the ratios "Lbefore/Lafter" obtained by dividing the distances Lbefore at the immediately previous time by the distances Lafter between the portable device 3 and the three transmission antennas ANT1 to ANT3 are greater than a predetermined value Delta (step S5).

In step S5, when the ratios "Lbefore/Lafter" of all the three transmission antennas ANT1 to ANT3 are equal to or less than the predetermined value Delta (N in step S5), the vehicle control module 12 determines that the portable device 3 does not head for any one of the three transmission antennas ANT1 to ANT3. Meanwhile, when the ratios "Lbefore/Lafter" of one or more antennas of the three transmission antennas ANT1 to ANT3 are greater than the predetermined value Delta (Y in step S5), the vehicle control module 12 determines that the portable device 3 heads for the one or more antennas, and determines whether or not the distances between the portable device 3 and the three transmission antennas ANT1 to ANT3 are less than a predetermined threshold (step S6).

In step S6, when the distances between the portable device 3 and all the three transmission antennas ANT1 to ANT3 are equal to or greater than the predetermined threshold (N in step S6), the vehicle control module 12 determines that the portable device 3 does not enter the approach unlock area Au. Meanwhile, when the distances between the portable device 3 and one or more antennas of the three transmission antennas ANT1 to ANT3 are less than the threshold (Y in step S6), the vehicle control module determines that the portable device 3 enters the approach unlock area Au of the one or more antennas, and transmits a signal instructing that the vehicle compartment doors 1a and the trunk door 1b are unlocked to the lock unit 32. The lock unit 32 that receives this signal unlocks the vehicle compartment doors 1a and the trunk door 1b (step S7).

Next, specific determination examples will be described with reference to FIGS. 3 to 6. FIGS. 3 to 6 are plan views showing the configuration of the vehicle-mounted device according to the first embodiment, and are diagrams showing Moving Path Examples 1 to 4 of the user. FIGS. 3 to 6 show examples in which a user U moves from the right in the rear of the vehicle 1, but the first embodiment may be applied to a case where the user moves from other directions. For example, when the user moves from the left in the rear, the vehicle control module determines whether or not the user approaches the antennas ANT2 and ANT3 instead of the antennas ANT1 and ANT3 in the examples of FIGS. 3 to 6. Here, when the portable device 3 moves from the right in the rear of the vehicle 1 as shown in FIGS. 3 to 6, since the radio waves from the antenna ANT2 are blocked by the vehicle 1 and are not received by the portable device 3 with sufficient strength, this antenna is excluded from the determination target.

Moving Path Example 1

In Example 1 shown in FIG. 3, the user U who carries the portable device 3 is located in a position P11 at a certain time, and moves to a position P12 at a time after one cycle. The position P11 is located within the approach detection area Ad, and the position P12 is located within the approach unlock area Au. As the portable device moves from the position P11 toward the position P12, the portable device 3 approaches the vehicle 1. Here, distances between the respective positions and the respective antennas are defined as follows. This definition is similarly applied to Examples 2 to 4.

Distance between position P11 and antenna ANT1: L1-before,

Distance between position P11 and antenna ANT3: L3-before,

Distance between position P12 and antenna ANT1: L1-after, and

Distance between position P12 and antenna ANT3: L3-after.

The flow of processes performed by the electronic key device in this case is as follows.

(1) The portable device 3 calculates the distances between the respective antennas and the portable device 3 based on the radio waves received from the vehicle-mounted device 2 every predetermined time. When the user comes to the position P11, it is determined that the portable device 3 enters the approach detection area Ad from the distances between the respective antennas and the portable device 3 (steps S1 to S3 of FIG. 2).

(2) Subsequently, when the user moves to the position P12, distances between the position P12 and the respective antennas are calculated, and it is determined whether or not these distances are less than the distances at the immediately previous time, that is, the distances between the position P11 and the respective antennas (step S4 of FIG. 2). Specifically, since the relationship of L1-before>L1-after is satisfied for the antenna ANT1 and the relationship of L3-before>L3-after is satisfied for the antenna ANT3, it is determined that the portable device 3 approaches any one of the antennas ANT1 and ANT3.

(3) Thereafter, it is determined whether or not ratios obtained by dividing the distances between the respective antennas and the position P11 at the immediately previous time by the distances between the position P12 and the respective antennas are greater than a predetermined value (step S5 of FIG. 2).

Specifically, since the relationship of L1-before/L1-after >Delta1 is satisfied for the antenna ANT1 and the relationship of L3-before/L3-after >Delta3 is not satisfied for the antenna ANT3, it is determined that the portable device 3 heads for the antenna ANT1.

The ratios are not limited to the ratios based on the distances at the immediately previous time, that is, the time before one cycle, and may be, for example, ratios based on distances every two cycles or three cycles. The same is true of the Moving Path Examples.

(4) It is determined that the distances between the position P12 and the respective antennas are less than the predetermined threshold (step S6 of FIG. 2). In Example 1 shown in FIG. 3, the distance between the portable device 3 and any one of the antennas ANT1 and ANT3 is less than the threshold, and it is determined that the portable device 3 is located within the approach unlock area Au.

(5) Through the determinations of (1) to (4) described above, it is determined that the portable device 3 moves up to the position P12 within the approach unlock area Au from the position P11 of the approach detection area Ad and approaches the vehicle 1 and moves toward the antenna ANT1, and thus, the process of unlocking the door near the antenna ANT1 is performed.

Moving Path Example 2

In Example 2 shown in FIG. 4, the user U who carries the portable device 3 is located in a position P21 at a certain time and moves to a position P22 at a time after one cycle. The position P21 is located within the approach detection area Ad, and the position P22 is located within the approach unlock area Au. However, the movement from the position P21 to the position P22 is a movement parallel to the right vehicle compartment door 1a. Here, the definition of the distances between the positions P21 and P22 and the respective antennas is the same as that in Example 1, and thus, the description thereof is omitted.

The flow of processes performed by the electronic key device in this case is as follows.

(1) The portable device 3 calculates the distances between the respective antennas and the portable device 3 based on the radio waves received from the vehicle-mounted device 2 every predetermined time. When the user comes to the position P21, it is determined that the portable device 3 enters the approach detection area Ad from the distances between the respective antennas and the portable device 3 (steps S1 to S3 of FIG. 2).

(2) Subsequently, when the user moves to the position P22, distances between the position P22 and the respective antennas are calculated, it is determined that these distances are less than the distances at the immediately previous time, that is, the distances between the position P21 and the respective antennas (step S4 of FIG. 2). Specifically, since the relationship of L1-before>L1-after is satisfied for the antenna ANT1 and the relationship of L3-before>L3-after is satisfied for the antenna ANT3, it is determined that the portable device 3 approaches both the antennas ANT1 and ANT3.

(3) Subsequently, it is determined whether or not ratios obtained by dividing the distances between the respective antennas and the position P21 at the immediately previous time by the distances between the position P22 and the respective antennas are greater than a predetermined value (step S5 of FIG. 2). Specifically, the relationship of L1-before/L1-after >Delta1 is not satisfied for the antenna ANT1 and L3-before/L3-after >Delta3 is not satisfied for the antenna ANTS. Thus, it is determined that the portable device 3 does not head for any one of the antennas.

(4) Through the determinations of (1) to (3) described above, it is determined that the portable device 3 moves from the position P21 of the approach detection area Ad up to the position P22 within the approach unlock area Au but moves without heading for any one of the antennas. Thus, the locked state of the vehicle 1 is maintained.

Moving Path Example 3

Figure 5:
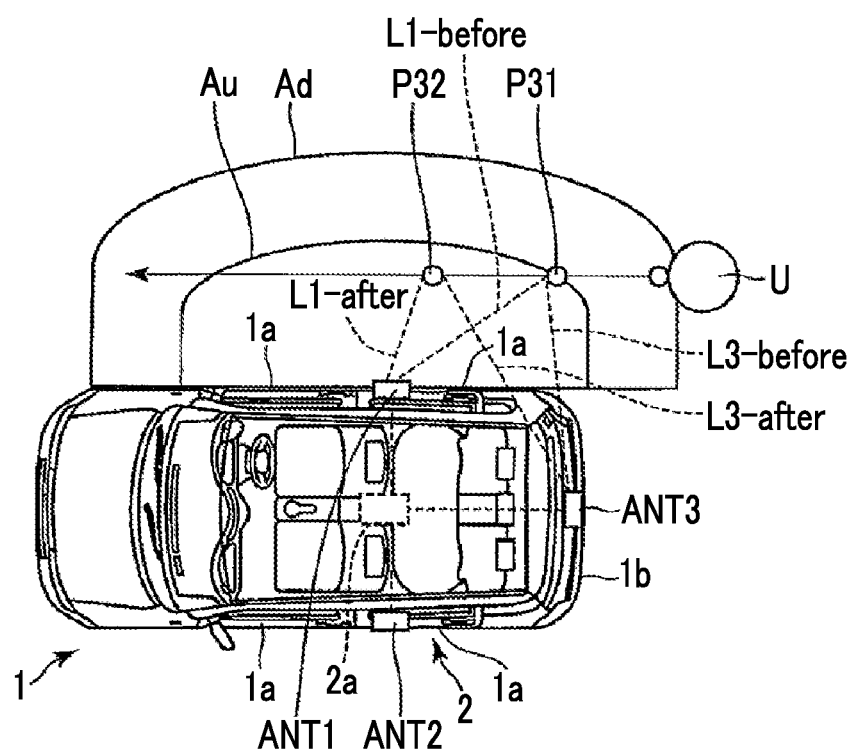
FIG. 5 is a plan view showing the configuration of a vehicle-mounted device according to the first embodiment, and is a diagram showing Moving Path Example 3 of the user.

In Example 3 shown in FIG. 5, the user U who carries the portable device 3 is located in a position P31 at a certain time and moves to a position P32 at a time after one cycle. Both the positions P31 and P32 are located within the approach unlock area Au, but the movement from the position P31 to the position P32 is a movement parallel to the right vehicle compartment door 1a. Here, the definition of the distances between the positions P31 and P32 and the respective antennas is the same as that in Example 1, and thus, the description thereof is omitted.

The flow of processes performed by the electronic key device in this case is as follows.

(1) The portable device 3 calculates the distances between the portable device 3 and the respective antennas based on the radio waves received from the vehicle-mounted device 2 every predetermined time. When the user enters the approach detection area Ad and comes up to the position P31, it is determined that the portable device 3 enters the approach detection area Ad from the distances between the respective antennas and the portable device 3 (steps S1 to S3 of FIG. 2).

(2) Thereafter, when the user moves toward the position P32, distances between the position P32 and the respective antennas are calculated, and it is determined whether or not these distances are less than the distances at the immediately previous time, that is, the distances between the position P31 and the respective antennas (step S4 of FIG. 2). Specifically, since the relationship of L1-before>L1-after is satisfied for the antenna ANT1 and the relationship of L3-before>L3-after is not satisfied for the antenna ANT3, it is determined that the portable device 3 does not approach the antenna ANT3.

(3) Subsequently, it is determined whether or not ratios obtained by dividing the distances between the respective antennas and the position P31 at the immediately previous time by the distances between the position P32 and the respective antennas are greater than a predetermined value (step S5 of FIG. 2). Specifically, since the relationship of L1-before/L1-after >Delta1 is not satisfied for the antenna ANT1 and the relationship of L3-before/L3-after >Delta3 is not satisfied for the antenna ANT3, it is determined that the portable device 3 does not head for any antenna.

(4) Through the determinations of (1) to (3) described above, it is determined that the portable device 3 moves up to the position P32 from the position P31 and does not approach the vehicle 1, and thus, the locked stage of the vehicle 1 is maintained.

Moving Path Example 4

Figure 6:
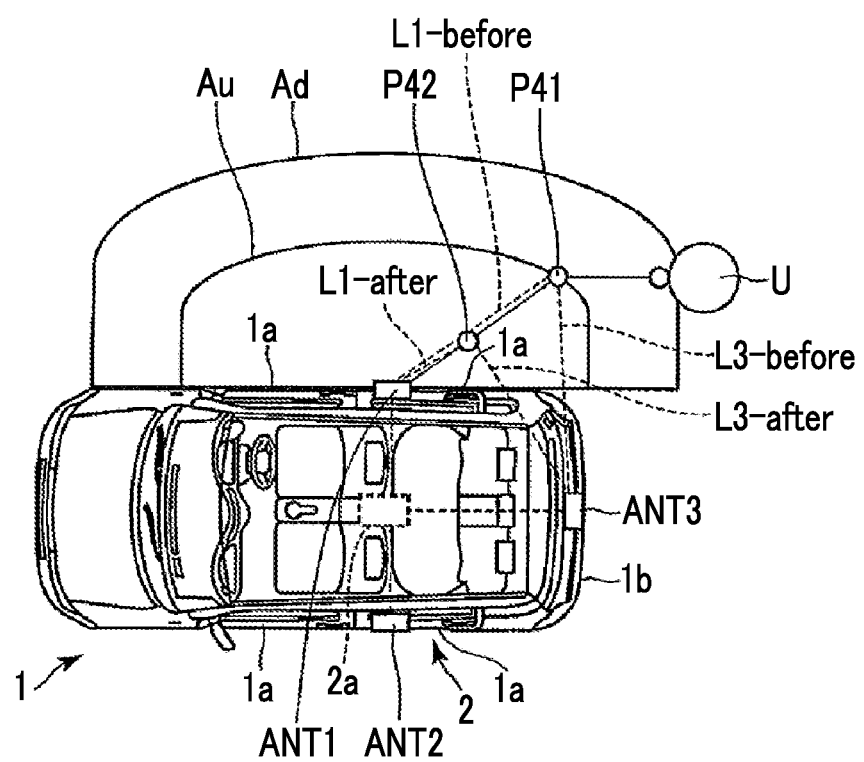
FIG. 6 is a plan view showing the configuration of a vehicle-mounted device according to the first embodiment, and is a diagram showing Moving Path Example 4 of the user.

In Example 4 shown in FIG. 6, the user U who carries the portable device 3 is located in a position P41 at a certain time and moves to a position P42 at a time after one cycle. Both the positions P41 and P42 are located within the approach unlock area Au. As the portable device moves from the position P41 toward the position P42, the portable device 3 approaches the vehicle 1. Here, the definition of the distances between the positions P41 and P42 and the respective antennas is the same as that in Example 1, and thus, the description thereof is omitted.

The flow of processes performed by the electronic key device in this case is as follows.

(1) The portable device 3 calculates the distances between the respective antennas and the portable device 3 based on the radio waves received from the vehicle-mounted device 2 every predetermined time. When the user enters the approach detection area Ad and comes up to the position P41, it is determined that the portable device 3 enters the approach detection area Ad from the distances between the respective antennas and the portable device 3 (steps S1 to S3 of FIG. 2).

(2) Subsequently, when the user moves toward the position P42, distances between the position P42 and the respective antennas are calculated, and it is determined whether or not the distances in this case are less than the distances at the immediately previous time, that is, the distances between the position P41 and the respective antennas (step S4 of FIG. 2). Specifically, since the relationship of L1-before>L1-after is satisfied for the antenna ANT1 and the relationship of L3-before>L3-after is satisfied for the antenna ANT3, it is determined that the portable device 3 approaches both of the antennas ANT1 and ANT3.

(3) Thereafter, it is determined whether or not ratios obtained by dividing the distances between the respective antennas and the position P41 at the immediately previous time by the distances between the position P42 and the respective antennas are greater than a predetermined value (step S5 of FIG. 2). Specifically, since the relationship of L1-before/L1-after >Delta1 is satisfied for the antenna ANT1 and the relationship of L3-before/L3-after >Delta3 is not satisfied for the antenna ANT3, it is determined that the portable device 3 heads for the antenna ANT1.

(4) It is determined whether or not the distances between the position P42 and the respective antennas are less than a predetermined threshold (step S6 of FIG. 2). In Example 4 shown in FIG. 6, the distances between the portable device 3 and both of the antennas ANT1 and ANT3 are less than the threshold, and it is determined that the portable device 3 is located within the approach unlock area Au.

(5) Through the determinations of (1) to (4) described above, it is determined that the portable device 3 moves up to the position P42 within the approach unlock area Au from the position P41 of the approach detection area Ad and approaches the vehicle 1 and moves toward the antenna ANT1, and thus, the process of unlocking the antenna ANT1 is performed.

A modification example will be described below.

In the first embodiment, the distances between the portable device 3 and the three transmission antennas ANT1 to ANT3 of the vehicle-mounted device 2 are calculated based on the reception strength of the radio waves received by the portable device 3, and the response signal including the information related to the calculated distances is transmitted to the vehicle-mounted device 2. Meanwhile, in the second embodiment, the portable device 3 may transmit the reception strength of the received radio waves to the vehicle-mounted device 2, and the vehicle control module 12 may calculate the distances between the portable device 3 and the three transmission antennas ANT1 to ANT3 of the vehicle-mounted device 2.

In the first embodiment, the three transmission antennas ANT1 to ANT3 are respectively provided near the two rear vehicle compartment doors and the trunk door, but the number and arrangement of transmission antennas are not limited thereto. For example, it is possible to perform a more accurate determination by providing the transmission antennas near all four vehicle compartment doors.

In such a configuration, according to the above embodiments, the following effects are exhibited.

(1) The response signal including the information related to the distances between the antennas and the portable device is transmitted from the portable device 3 to the vehicle-mounted device every cycle, based on the reception strength of the radio waves transmitted from the three antennas ANT1 to ANT3. In the vehicle-mounted device 2, the distances between the respective antennas and the portable device 3 and the moving direction of the portable device 3 are determined from the response signal, and it is determined that the moving direction of the portable device 3 heads for any of the antennas. When it is determined that the distance between the vehicle 1 and the portable device 3 is equal to or less than the predetermined threshold, control is performed such that the vehicle compartment door 1a closest to the antenna for which the portable device 3 heads becomes unlocked.

Thus, when the user enters the approach unlock area Au, and only when the user approaches toward the vehicle compartment doors 1a and the trunk door 1b of the vehicle 1, that is, only when the user tries to enter the vehicle 1, it is possible to reliably unlock the door. In other words, it is possible to reliably determine the case where the user tries to enter the vehicle 1 as mentioned above and a case where a user who does not try to enter the vehicle 1 passes the approach unlock area Au, and even when the user who does not try to enter the vehicle 1 approaches the vehicle, the unlocking process is not performed.

(2) When it is determined that the distances between the portable device 3 and the three antennas ANT1 to ANT3 are less than the distances obtained from the response signal received at the previous time by a predetermined percentage or more or a predetermined difference or more, it is determined that the portable device 3 heads for any one of the antennas.

Since the determinations are performed using the ratio and the difference between the distances at two different times, it is possible to reliably determine the moving direction of the user who carries the portable device 3 with a simple configuration.

(3) The three antennas ANT1 to ANT3 are provided near the vehicle compartment doors 1a of the vehicle 1 and near the trunk door 1b.

Thus, since it is possible to specifically determine which door the user tries to approach, it is possible to reliably unlock the door only when the user tries to enter the vehicle 1.

Second Embodiment

Next, a second embodiment of the present invention will be described. In the first embodiment, it is determined whether or not the portable device 3 heads for any one of the antennas from the ratio and the difference between the distances included in the response signal transmitted from the portable device 3 and the distances included in the response signal received at the previous time. Meanwhile, in the second embodiment, based on the reception strength of the radio waves received by the respective axes of the reception antenna 23 (three-axis reception antenna) of the portable device 3, a reception vector indicating a direction in which the reception strength is the highest based on the reception strength in three directions crossing each other is calculated, and a response signal including this reception vector is transmitted to the vehicle-mounted device 2. Here, the reception vector is a quantity having reception strength and direction.

In the vehicle-mounted device 2, the vehicle control module 12 determines whether or not the moving direction of the portable device 3 heads for any one of the antennas from information related to the reception vector included in the response signal. Other configurations are the same as those in the first embodiment, and thus, the detailed description thereof is omitted.

In the second embodiment, the approach determination performed by the vehicle control module 12 is as follows.

(a) When it is determined that the distances included in the response signal transmitted from the portable device 3 are less than the distances included in the response signal received at the previous time (for example, a time before a predetermined time), it is determined that the portable device 3 heads for any one of the antennas.

(b) It is determined whether or not the moving direction of the portable device 3 heads for any antenna based on the information related to the reception vector included in the response signal transmitted from the portable device 3. For example, when a time change in the direction of the reception vector is less than a predetermined value, it is determined that the portable device heads for any one of the antennas.

As stated above, since it is determined whether or not the moving direction of the portable device 3 heads for any one of the antennas from the information related to the reception vector, the electronic key device can have a simple configuration, and it is possible to reduce a load in the determination process performed by the vehicle-mounted device 2.

Other operations, effects and modification examples are the same as those in the first embodiment.

While the present invention has been described in conjunction with the embodiments, the present invention is not limited to the aforementioned embodiments. Changes and modifications are possible without departing from the ideals of the present invention.

As above, the electronic key device according to the present invention determines whether or not the user tries to enter the vehicle based on the moving direction of the portable device carried by the user, and it is possible to perform the unlocking process only when the user tries to enter the vehicle. Accordingly, it is possible to prevent the door from being unlocked in an unintended situation.

It should be understood by those skilled in the art that various modifications, combinations, sub-combinations and alterations may occur depending on design requirements and other factors insofar as they are within the scope of the appended claims of the equivalents thereof.

What is claimed is:

1. An electronic key device comprising:
a portable device to be carried by a user; and
a vehicle-mounted device mounted on a vehicle and configured to be in communication with the portable device so as to perform predetermined control, the vehicle-mounted device including a plurality of antennas provided in different positions of the vehicle and configured to transmit radio waves at a predetermined or variable time interval,
wherein the portable device is configured to transmit a response signal to the vehicle-mounted device based on a reception strength of the radio waves transmitted from the plurality of antennas,
wherein the vehicle-mounted device is further configured to unlock a door of the vehicle if it is determined from the response signal that the portable device is moving in a direction toward any one of the plurality of antennas, and that a distance between the vehicle and the portable device is equal to or smaller than a predetermined threshold value, and
wherein the vehicle-mounted device determines that the portable device is moving in the direction toward any one of the plurality of antennas if a currently-obtained distance between at least one of the plurality of antennas and the portable device is smaller than a previous distance between the at least one antenna and the portable device obtained from a previous response signal by a predetermined ratio or more or by a predetermined difference or more.

2. The electronic key device according to claim 1,
wherein the portable device includes a three-axis antenna capable of detecting reception strength in three directions orthogonal to each other, and calculates a reception vector indicating a direction having a highest reception strength based on the reception strength in the three directions, the response signal including information of the reception vector, and
wherein the vehicle-mounted device determines whether or not the portable device is moving in the direction toward any one of the plurality of antennas from the information of the reception vector in the response signal received.

3. The electronic key device according to claim 2,
wherein the vehicle-mounted device determines that the portable device is moving in the direction toward any one of the plurality of antennas when a temporal change in the direction of the reception vector is less than a predetermined value.

4. The electronic key device according to claim 1,
wherein the plurality of antennas are provided in a respective vicinity of vehicle compartment doors and a trunk door of the vehicle.

5. The electronic key device according to claim 1,
wherein the vehicle-mounted device unlocks the door of the vehicle which is closest to the one of the plurality of antennas toward which the portable device is determined to be moving.

* * * * *